Figure 1:
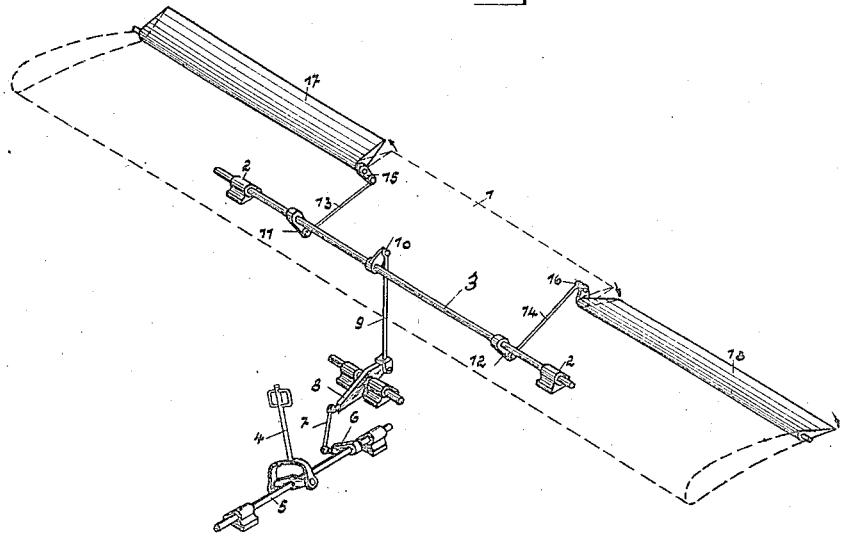

H. JUNKERS.
STABILIZATION OF FLYING MACHINES.
APPLICATION FILED JUNE 28, 1920.

1,407,425.

Patented Feb. 21, 1922

Inventor:
Hugo Junkers

UNITED STATES PATENT OFFICE.

HUGO JUNKERS, OF DESSAU, GERMANY.

STABILIZATION OF FLYING MACHINES.

1,407,425.  Specification of Letters Patent.  Patented Feb. 21, 1922.

Application filed June 28, 1920. Serial No. 392,590.

*To all whom it may concern:*

Be it known that I, HUGO JUNKERS, a citizen of the German Empire, residing at Dessau, Germany, have invented certain new and useful Improvements in the Stabilization of Flying Machines, for which I have filed an application in Germany June 4, 1919, and of which the following is a specification.

My invention relates to the stabilization of flying machines and more especially to improvements in the operating mechanism for the balancing planes thereof. According to my invention the supporting surface which these balancing planes are attached to, carries a shaft preferably extending through said supporting surface from one balancing plane to the other. This shaft is caused to oscillate by suitable means connected with the steering device, which may be of any suitable construction such as a wheel or a lever steering device. These oscillatory movements are transmitted by means of levers and rods to the two balancing planes in such a manner, that as the shaft is turned the said faces are moved in opposite directions.

The transmission of movement from the steering device to the shaft may be effected in any suitable manner, for instance by a simple mechanism adapted to transmit traction and pressure, or by wires or ropes and the like or by the immediate transmission of rotating movements, by aid of chains and chain wheels or shafts and gear wheels. The arrangement of rigid intermediate members adapted for the transmission of traction and pressure is, on account of its simplicity, especially advantageous in the first line in those cases, where for the sake of safety a duplication of the members for transmitting the steering movements is required. For the purpose of ensuring a free mobility of the steering apparatus even in the case of deformations of the flying machine and in spite of said duplication of parts, the two rigid intermediate members engaging with the shaft mounted on the supporting surface are preferably arranged in such a manner, that an oscillation of the steering lever results in an identical movement of both said members in the same direction. This can be obtained by providing that both intermediate members engage with levers rigidly connected to the shaft and directed towards the same side.

In the drawings affixed to this specification and forming part thereof two embodiments of my invention are illustrated diagrammatically.

Fig. 1 being a perspective view of an operating mechanism for the balancing planes, in which the transmission of the steering movement to the shaft mounted on or in the supporting surface is effected by an intermediate member adapted for the reception of traction and pressure.

Figure 2:
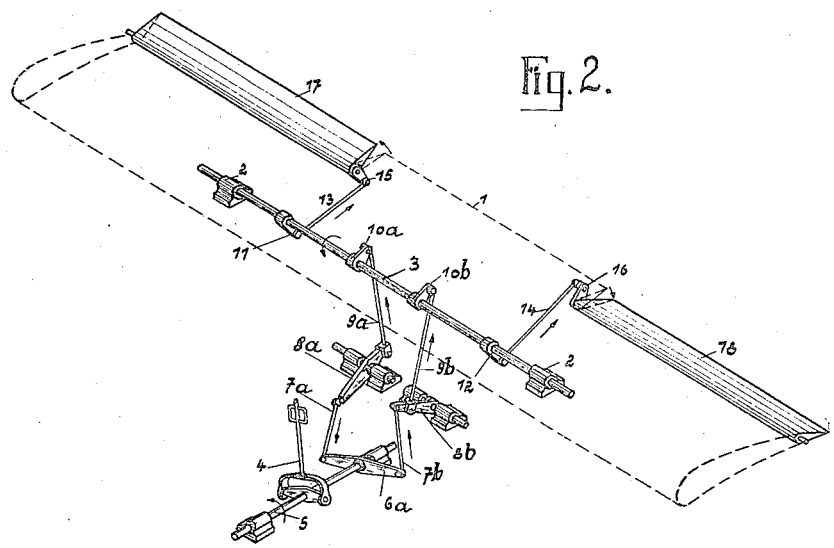

Fig. 2 is a like view of an operating mechanism for the balancing planes, in which the intermediate rods serving to transmit the movements of the steering lever to the shaft mounted on or in the supporting wing are provided in duplicate and in which a jamming or twitching of the rods such as might occur in consequence of changes of position between the supporting surface and the steering device are obviated thereby, that a movement of the steering device will result in an identical movement of both intermediate members in the same direction.

Referring to Fig. 1 of the drawings, 3 is the shaft rotatably mounted in bearings 2 attached to the supporting surface 1. The lateral oscillatory movements of the steering lever 4 are transmitted to the shaft 5 and further from said shaft by lever 6, rod 7, lever 8, rod 9 and lever 10 to the main shaft 3. The movements of shaft 3 are transmitted to the levers 15 and 16, secured to the balancing planes 17 and 18 by levers 11, 12 and rods 13, 14. As the two levers 11 and 12 extend in the same direction, while the levers 15 and 16 are directed in opposite directions, one balancing face will be raised, while the other one is lowered.

In the modification illustrated in Fig. 2 the movement of the steering lever 4 is transmitted to the shaft 3 by means of two rods $9^a$, $9^b$ adapted to transmit traction and pressure, and levers $10^a$, $10^b$. In order to obviate additional strains in these rods and levers and their bearings, although the steering device is rigidly mounted in the body and the shaft 3 on the supporting surface 1, and in order to enable the steering device to adapt itself to deformations arising in the flying machine, the rods $9^a$ and $9^b$ are caused to always move in the same direction. In view thereof the levers $10^a$ and $10^b$ secured to the shaft 3 and engaging with the rods $9^a$ and $9^b$ are directed towards the same side. The lever $9^a$ is a double-armed lever, the lever 8ᵇ however a one-armed lever, the points of engagement of the rods 9ᵃ and 9ᵇ being located on opposite sides of the turning axes of these levers, an evenly directed movement of the rods 9ᵃ and 9ᵇ being thus caused. The levers 8ᵃ and 8ᵇ are moved by means of rods 7ᵃ, 7ᵇ from a double-armed lever 6ᵃ, fixed to shaft 5. Thus all the members serving for the transmission of movement between the shafts 3 and 5 are provided in duplicate.

An easy yielding of the steering mechanism could not take place, if the levers 10ᵃ and 10ᵇ were extending in opposite directions, as in that case the slightest change of position of the shaft 3 relatively to the bearings of the intermediate levers 8ᵃ, 8ᵇ would result in additional strains and in a clamping or jamming of the steering mechanism. With the two rods 9ᵃ, 9ᵇ however moving in the same direction the steering mechanism can easily follow any change of position between shaft 3 and the steering device, and is therefore not subject to any additional strain, but merely to a slight displacement of its zero position.

I claim:

1. In a flying machine in combination, a supporting surface, balancing planes pivotally attached to said surface, a shaft extending substantially transversely to said surface, bearings for said shaft fixed to said surface, transmission members on the axes of said planes and on said shaft, respectively, the members on one of said parts extending in different directions, members connecting said plane transmission members with said shaft transmission members and a steering device adapted to oscillate said shaft.

2. In a flying machine in combination, a supporting surface, balancing planes pivotally attached to said surface, a shaft extending substantially parallel to said planes, bearings for said shaft fixed to said surface, levers on the axes of said planes extending in opposite directions, levers on said shaft extending in one direction, rods connecting said plane levers with said shaft levers and a steering device adapted to oscillate said shaft.

3. In a flying machine in combination, a supporting surface, balancing planes pivotally attached to said surface, a shaft extending substantially transversely to said surface, bearings for said shaft fixed to said surface, transmission members on the axes of said planes and on said shaft, respectively, the members on one of said parts extending in different directions, members connecting said plane transmission members with said shaft transmission members, a steering device, a third transmission member on said shaft and a member connecting said steering device with said third member.

4. In a flying machine in combination, a supporting surface, balancing planes pivotally attached to said surface, a shaft extending substantially transversely to said surface, bearings for said shaft fixed to said surface, transmission members on the axes of said planes and on said shaft, respectively, the members on one of said parts extending in different directions, members connecting said plane transmission members with said shaft transmission members, a pair of evenly directed transmission members on said shaft intermediate between said first-mentioned members, a steering device comprising a double-armed lever and a pair of transmission levers connected therewith, one being a single-armed and one a double-armed lever, and a pair of members connecting said intermediate members to opposite sides of said transmission levers.

In testimony whereof I affix my signature.

HUGO JUNKERS